United States Patent [19]
Richards

[11] 4,281,280
[45] Jul. 28, 1981

[54] THERMAL ELECTRIC CONVERTER

[76] Inventor: John A. Richards, 37 Stone St., Beverly, Mass. 01915

[21] Appl. No.: 970,212

[22] Filed: Dec. 18, 1978

[51] Int. Cl.³ .......................... H02N 21/00; H02N 7/00
[52] U.S. Cl. .................................... 322/2 R; 310/306
[58] Field of Search ............................ 322/2; 310/306

[56] References Cited

U.S. PATENT DOCUMENTS

| | | | |
|---|---|---|---|
| 3,174,063 | 3/1965 | Gibbons | 310/306 |
| 3,176,164 | 3/1965 | Beggs | 310/306 |
| 3,201,618 | 8/1965 | Coleman | 310/306 |
| 3,264,512 | 8/1966 | Beggs | 310/306 |
| 3,452,224 | 6/1969 | Hernqvist et al. | 310/306 |

*Primary Examiner*—Robert J. Hickey
*Attorney, Agent, or Firm*—Thomas C. Stover, Jr.

[57] ABSTRACT

Method and apparatus are provided for converting heat to electricity wherein a non-porous dielectric barrier layer is placed on a conducting member, a cathode is placed on the barrier layer, a grommet is placed thereon and an anode is mounted on the grommet in spaced proximity with the barrier layer and the cathode to define a chamber. The anode and the cathode are electrically connected across a load by external circuit means. Gas is then admitted to the chamber and maintained at a desired pressure. DC voltage is then applied across the above electrodes and the conducting member to establish an electric field therebetween and heat is applied to the conducting member to cause current to flow in the external circuit.

In another embodiment, porous dielectric material is placed in the cavity to enhance such current flow.

36 Claims, 3 Drawing Figures

THERMAL ELECTRIC CONVERTER

FIELD OF THE INVENTION

This invention relates to method and apparatus for converting heat to electricity. More particularly, this invention relates to the application of heat to gas in an electric field to obtain electricity.

THE PRIOR ART

For many years, efforts have been made to convert heat energy to electric energy. One inefficient, indirect and well-known example is the steam engine, where heat is applied to the boiler to produce steam, to drive a turbine and an attached generator to produce electricity. This method, as is evident, is complicated, subject to wear and is of low efficiency. A more inefficient example is the common four-stroke gasoline engine connected to a generator to likewise produce electricity.

A more direct method and apparatus for converting heat to electricity is known as the thermionic converter. This apparatus depends on the property of a metal, which when heated in a vacuum, produces an electron cloud around itself. When a metal grid or plate is placed in the electron cloud, a current will flow if said grid or plate is connected electrically to the hot metal which produces such electron cloud. The thermionic converter, however, is characterized by low output voltage, high temperature of operation and low efficiency.

Accordingly, it is believed that prior to the present invention a thermal electric converter which converts heat directly to electricity and which operates at surpassing efficiency has not been known and there is a need and market for such thermal electric converter, which obviates the above shortcomings.

There has now been discovered method and apparatus for a thermal electric converter which operates at relatively low temperature, converts heat directly to electricity and operates at surpassing efficiency to provide electricity to an external load, eg. to drive a motor, and which is capable of substantial output voltage and current. The apparatus of the invention is believed highly durable, since it can operate with no moving parts. Further, the method and apparatus of the invention is believed a significant step forward in the art and provides low cost, efficient conversion of heat to electricity at significant voltages and current.

SUMMARY OF THE INVENTION

Broadly, the present invention provides a method for converting heat to electricity comprising positioning a non-porous dielectric barrier layer proximate a conducting member, positioning a first electrode proximate the barrier layer on the other side thereof and positioning a second electrode in spaced proximity with the barrier layer and the first electrode. The second electrode and the first electrode are electrically connected by external circuit means. Gas is then admitted in the space between the second electrode and the barrier layer and maintained at a desired pressure. DC voltage is then applied across the electrodes and the conducting member to establish an electric field therebetween and heat is applied to the conducting member to cause current to flow in the external circuit.

The invention further provides a thermal electric converter comprising a conducting member, a non-porous dielectric barrier layer mounted at least proximate the member, a first electrode positioned at least proximate the layer on the reverse side thereof, an enclosure member of non-conducting material mounted on the layer at least partially enclosing the first electrode and defining a cavity with the layer. A second electrode is mounted in spaced proximity with the first electrode and the barrier layer, which second electrode extends at least partially across the enclosure member to at least partially close the cavity. Means for connecting the second electrode and the first electrode through external circuitry is provided. Means are further provided to introduce and maintain gas in the cavity at a desired pressure. A voltage means applies DC voltage across the conducting member and the electrodes and means to apply heat to the conducting member to cause current to flow from the second electrode to the first electrode through the external circuitry.

The invention further provides for placing porous dielectric material between the barrier layer and the second electrode or between the electrodes in the above disclosed method and apparatus embodying the invention.

BRIEF DESCRIPTION OF THE DRAWINGS

The invention will become more apparent from the following detailed specification and drawings in which.

DETAILED DESCRIPTION OF THE DRAWINGS

Figure 1:
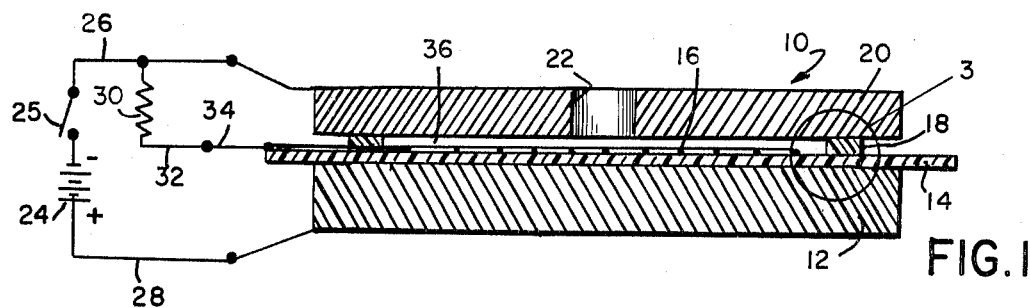
FIG. 1 is a sectional elevation view of the thermal electric converter embodying the invention shown in FIG. 2, taken on line 1—1, looking in the direction of the arrows.
Figure 2:
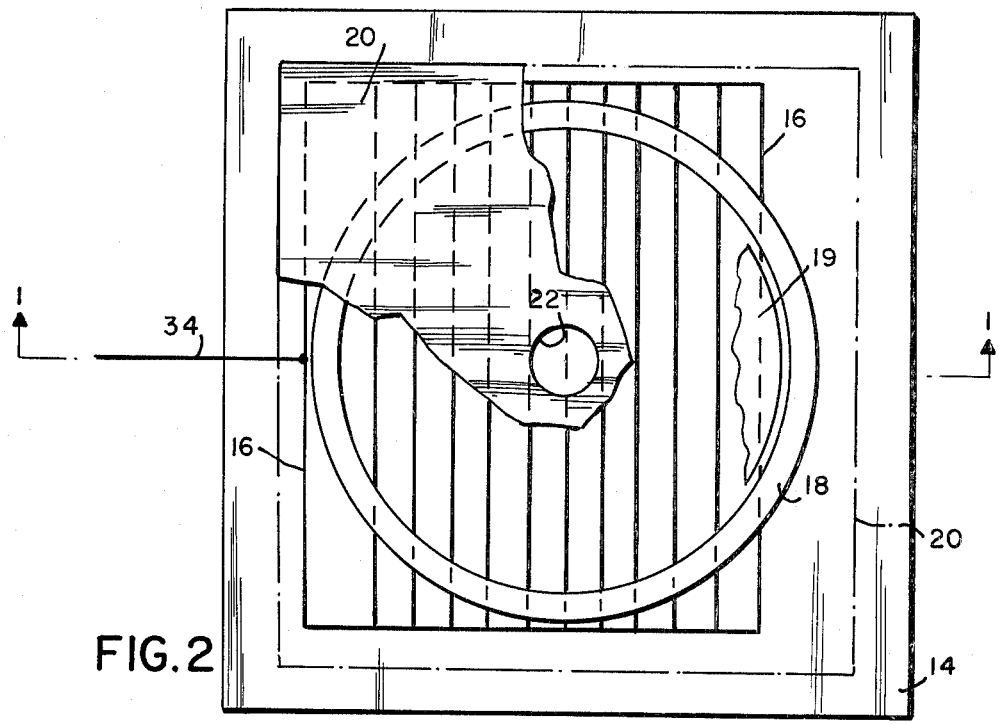
FIG. 2 is a schematic plan view of a portion of the thermal electric converter of FIG. 1
Figure 3:
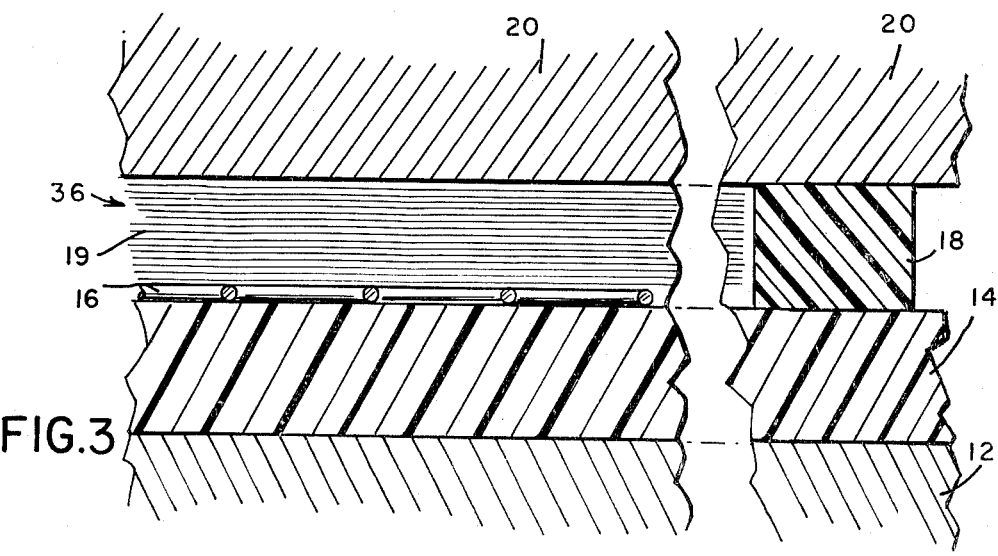
FIG. 3 is an enlarged fragmentary sectional view of a portion of the thermal electric converter shown in FIG. 1.

Referring in more detail to the drawings, the thermal electric converter 10 has conductive plate (hot side) 12, upon which is mounted non-porous dielectric barrier layer 14, upon or above which is mounted grid wire cathode 16, non-conductive spacer gasket 18, and anode plate (cold side) 20, having pressure control port 22 as shown in FIGS. 1, 2 and 3. As can be seen in FIGS. 1 and 3 of the drawings, the barrier layer 14, the spacer gasket 18 and the anode plate 20 define an enclosed cavity 36 therein.

Advantageously, porous dielectric material or filler 19, eg. cellulose such as layers of paper, are placed in such cavity 36 between the barrier layer 14 and the anode plate 20 as indicated in FIG. 3.

The cavity 36, while containing the porous filler 19, is evacuated by way of gas port 22, and gas eg. nitrogen, is admitted to the cavity 36 (and into the porous filler 19), again by gas port 22, which gas is maintained therein at a desired pressure eg. a pressure of 0.10 Torr.

A DC voltage source 24 is connected across the conductive plate 12 and the anode plate 20 by external conductive leads 26 and 28, as shown in schematic in FIG. 1. The anode plate 20 can further be electrically connected across an external load 30, to the cathode grid wire 16 by way of the conductive lead 26, the external resistance 30, the conductive lead 32 and the grid input wire 34, as shown in FIG. 1.

The thermal electric converter, embodying the invention, is now operated as follows. The power switch 25 is closed and a DC voltage is applied across the electrodes, ie. a conducting plate and the grid wire 16, and across the conducting member or plate 12, causing the grid wire 16 to have a charge potential similar to that of the anode conductive plate 20 and opposite to conductive plate 12 on the other side of the barrier layer 14, shown in FIG. 1.

When the applied DC voltage is sufficient, nitrogen gas molecules in the chamber or cavity 36 are ionized at or near the grid wire 16 and migrate through the porous filler 19 to the dielectric layer 14, drawn by the positive charge on the conductive plate 12. This gas ion migration continues until there is a balance across the dielectric barrier layer 14 between positive and negative charges and the electric field in the gas cavity is accordingly reduced to a final stable level and no significant current flows. That is, the gas ions are attracted proximate the barrier layer 14 by the positively charged plate 12.

According to the present invention, upon application of heat to the conductive plate 12, the charged gas molecules or ions adjacent or near the barrier layer 14, begin to acquire sufficient kenetic energy to overcome the above-described attraction or potential barrier created by the above-described residual electric field and diffuse or migrate through the porous filler up to and into contact with the anode conductive plate 20, to transfer their charge thereto thus lowering the potential of the grid electrode wire 16 and raising the potential of the anode conductive plate 20, causing a current to flow through the external load thus directly converting heat to electricity according to the present invention.

The load can be, for example, an electric motor, and thus according to the present invention, heat can be directly converted to electricity to drive such motor without the intermediate steps and equipment and consequent low efficiency characteristic of the prior art. For examples, the steam turbine or the gasoline engine and the associated generator is omitted and heat is directly converted to electric power according to the method and apparatus of the present invention.

The thermal electric generator embodying the present invention can also be employed in motor vehicles. For example, one can remove the engine from a motor vehicle, insert such converter, and apply heat to the converter to create the electric current to drive an electric motor and thus the vehicle to provide eg. an electric auto.

The conducting members can be solid, hollow or apertured including wire. Preferably, however, the conducting members are conductive plates eg. of metal such as copper, or silver and preferably silver. The conductive members can take various shapes from angular to rounded or a combination thereof.

The non porous dielectric barrier layer mounted proximate the hot side conductive member can be of any non-porous, non-conductive or electrically insulating material such as glass and preferably of plastic, eg. PVC, polystyrene, polyolefins including polyethylene and virtually any other non porous plastic. The dielectric barrier can be of various thicknesses eg. from 0.01 to 0.055 inches thick. The dielectric barrier further is located proximate or in contact with the hot side conductive plate and extends beyond the peripheries of both plates, as indicated in FIG. 2, to prevent arcing when higher voltages are employed, eg. voltages over 1000 volts. The dielectric can be a separate layer or can be coated to the hot side conductive plate.

The dielectric barrier layer can, as indicated, be coated with a thin conductive surlayer, porous or non-porous, including a printed circuit-like structure or an evenly-disbursed conductive surlayer, which surlayer serves to enhance the distribution of charges on such dielectric barrier layer and which surlayer can be used with or if desired, in place of, the above described first electrode including the grid electrode.

The cathode can be a grid of conductive material, an apertured sheet or plate of conductive material, conductive wires including wires or bars arranged in a grid, projecting points of conductive material eg. upstanding wire bristles, or even a conducting layer, impervious or apertured, printed on the surface of the dielectric layer (eg. one to ten or more molecules thick). The grid can be closely spaced with the dielectric layer or in contact therewith. Preferably the electrode is a grid of wires of metal eg. copper which is mounted in proximity or in contact with the dielectric layer.

The non-conducting enclosure member can be a gasket or other annular body mounted on the dielectric barrier and on or around the first electrode or cathode to define a cavity therewith. The enclosure member can be rounded, angular or a combination thereof and preferably is of non-porous, non-conductive material eg. of plexiglass, or acrilic and preferably of plexiglass. The enclosure can be of various heights eg. depending on the application and materials employed eg. 0.00001 to 0.050 inches.

The enclosure member should form a gas-tight seal with the dielectric barrier layer on one side and the anode or cold side conductive member on the other side, to define a porous dielectric/gas chamber therebetween. As indicated in the drawings, the anode or cold side conductive member, also known as the second electrode, has an aperture therethrough which communicates with the cavity or gas chamber so that gas may be withdrawn or admitted to said chamber and maintained at a desired pressure.

The porous dielectric filler can be omitted, within the scope of the method and apparatus embodying the invention and the current will flow upon application of heat to the hot side conductive member, as above described. However, insertion of the porous filler between the barrier layer and the anode is preferred as the filler layers assist the charges in traversing the gas cavity from such barrier layer to anode, analagous to a flight of stairs, making possible higher voltages and current output (in the external circuit) at lower input DC voltage and/or lower applied heat to the hot side.

The porous dielectric filler material can be of porous plastic, sintered glass, fibregiass, cellulose, fibers, sheet or block, eg. layers of paper and the like or a combination thereof. In a preferred embodiment, a stack of paper sheets is packed into the gas cavity between and in contact with respectively the barrier layer and the anode.

The above filler that is chosen, whether in layer, block or other form, preferably (but not necessarily) spans the cavity from the barrier layer and/or the cathode to the anode.

Further the porous dielectric fillers can have additives thereto to enhance the transmission of charged particles therethrough eg. photoemissive materials such as Cesium.

Accordingly "gas" as used herein, includes a plurality of mobile particles which can include molecules, eg. gas molecules; charged molecules; ions, eg. gas ions; electrons or a combination of two or more thereof. The gas employed can include nitrogen, freon, xenon, argon and other inert gases; can be a vapor, including water vapor, mercury vapor and the like at various pressures; or can be a plurality of electrons in a vacuum or near vacuum, which electrons eg. are emitted from the cathode and act like a gas, all of which are included in the specification under the term "gas".

The gas is evacuated from or introduced to the porous dielectric/gas chamber through, the gas port, by pump means not shown.

Without limiting the scope of the present invention, the following general example of operation is now given. In operation, the electric field is applied, as above described and the gas particles, moving randomly, contact electric charges including electrons at or near the dielectric layer, pick up same and become charged and are then held proximate the dielectric layer by the oppositely charged (hot side) conductive member. Then, upon application of heat to such hot side conductive member, the kinetic energy of such gas particles increases until the attractive forces acting thereon are overcome and such particles migrate across the porous dielectric/gas chamber and contact the second electrode or anode imparting their charges or electrons so carried thereto, causing current to flow in the external circuit back to the first electrode as above described. The particles then return to or near the barrier layer to pick up additional charges and the cycle is repeated to cause said current to flow in proportion to the heat applied to the hot side conductive member.

The gas in the gas chamber can be maintained at atmospheric pressure, above atmospheric pressure, and below atmospheric pressure, depending upon the type of system employed eg. the type of gas, the applied voltage and heat, the size of the gas chamber and the like. Generally reduced gas pressure is employed eg. 0.1 to $1 \times 10^{-5}$ torr, depending upon the requirements of the system.

When the pressure in the chamber is reduced to near vacuum, electrons, eg. from the cathode, become the charge carriers as indicated above.

At elevated gas pressures in the chamber of eg. near or above atmospheric, the internal electrical resistance of the device increase, as does the thermal conductivity of the gas-dielectric cavity, which can reduce the efficiency of thermal conversion of the invention. Accordingly, optimum voltage ranges can in each application be determined eg. by varying the pressure in the gas chamber and observing a volt meter or ammeter connected in the external circuit. Thus in the example given below, a pressure of 0.1 torr to $1 \times 10^{-5}$ torr was found to provide effective current flow in the thermal electric converter of the invention.

The amount of voltage applied across the conductive members and the first electrode (cathode) will of course vary with the application, eg. the size of the gas chamber, the type gas employed, the gas pressure, and the applied heat to the hot side conductive member. However, such applied voltage can be up to 20,000 volts or more including a suitable range of eg. from 10,000 to 20,000 volts to establish the desired electric field.

The applied voltage is direct current voltage and can be from any desired source including DC batteries, or other sources eg. DC generators and rectified A.C. It is noted that once the applied voltage results in a equilibrium or stabilized field, there is very little or no significant current drain on the voltage source.

Heat is applied to the hot side as a conductive member as above-mentioned by any convenient means eg. sunlight without or with reflective mirrors and lenses, flame or other suitable heating means, including heated eutetic salts.

It is preferred that the current flow be from the anode conductive member through external circuitry to the first electrode since it is externally that the load eg. an electric motor, will be connected into the circuit.

From the above specification, it can be seen that once the voltage is applied to the conductive members and first electrode, equilibrium is reached and then heat is applied to provide kenetic energy to transfer charges across the porous dielectric/gas chamber to establish the current cycle or flow. Once the applied heat is diminished, the electric charge transfer from first electrode to the anode conductive member and the current flow in the external circuit will diminish in proportion to the reduction of applied heat.

The following example is presented to illustrate the invention and should not be construed in limitation thereof.

EXAMPLE I

A thermal electric converter according to the invention and as illustrated in the drawings, was constructed for practical operation. The hot side conductive member as well as the cold side conductive member or anode, were each a circular aluminum plate 0.5 inches thick and 5.5 inches in diameter. Mounted on the hot side conductive plate, as the dielectric barrier layer, was a barrier sheet of polycarbonate resin (Lexan), 1/20 inch thick which extended three inches past the periphery of the respective plates on all sides. As the first electrode or cathode, a grid of copper wire of diameter 5.5 mils and mesh spacing of 60 mils was positioned on the upper surface of the barrier sheet. A ring gasket of acrylic (plexiglass) 42 mils thick and 5.5 inches I.D. was positioned atop the wire grid and barrier sheet and sealed thereto with epoxy. A porous dielectric in the form of a stack of (10 mil) paper discs was placed within the gasket on the cathode. The aluminum anode plate was then positioned atop the gasket to slightly compress the stack of paper discs and to define a gas/dielectric chamber within said gasket. The anode plate was also sealed to the gasket with epoxy.

An ammeter was then connected between the anode and the wire grid electrode, which ammeter served as the external circuit load.

Through an aperture in the anode plate, nitrogen gas was introduced into the gas/dielectric chamber and pressure was established at 0.1 torr. A rectified and filtered AC voltage source was switched on, applying 20,000 volts DC across the plates and grid wire cathode, which was connected to the anode plate. Electric field equilibrium was soon reached and the current flow from the voltage source was undetectable.

Thereupon heat was applied to the hot side aluminum plate until it was heated 60° F. above the anode or cold side aluminum plate. At this temperature difference of 60° F., a current output of 5 microamperes was read on the ammeter which current continued as long as the heat was so applied.

From the above specification it can be seen that the thermal electric converter embodying the present invention provides method and apparatus for the efficient conversion of heat to electricity, eg. BTU's to Watts, which can be used to drive various loads, including stationary or moveable power systems that can be operated by electricity, including motors, motor vehicles, lighting system or any system that is operated by electricity.

As noted herein, the thermal converter of the invention has no moving parts and in addition to being efficient, is highly durable and compares favorably on both counts, with a four stroke gasoline engine or a steam engine connected to a generator.

What is claimed is:

1. A thermal electric converter comprising a conducting member, a non-porous dielectric barrier layer mounted at least proximate said member; a first electrode positioned at least proximate said layer on the reverse side thereof; an enclosure member of non-conducting material mounted on said layer at least partially enclosing said first electrode and defining a cavity with said layer; a second electrode mounted in spaced proximity with said first electrode and said barrier layer, which second electrode extends at least partially across said enclosure member to at least partially close said cavity; means for connecting said second electrode and said first electrode through external circuitry; means to introduce and maintain gas in said cavity at a desired pressure; means to apply a DC voltage across said conducting member and said electrodes and means to apply heat to said conducting member to cause current to flow from said second electrode to said first electrode through said external circuitry.

2. The apparatus of claim 1 having porous dielectric material positioned in said cavity between said barrier layer and said second electrode.

3. The apparatus of claim 1 wherein said porous dielectric material is positioned between said first and second electrodes.

4. The apparatus of claims 1, 2 or 3 wherein said porous dielectric material is of cellulose material.

5. The apparatus of claim 4 wherein said material is layers of paper.

6. The apparatus of claim 5 wherein said material is a packed stack of paper filling the cavity between said barrier layer and second electrode.

7. The apparatus of claims 1 or 2 wheren said conducting member and said second electrode are conducting plates.

8. The apparatus of claims 1 or 2 wherein said first electrode is a grid of metal wire.

9. The apparatus of claims 1 or 2 wherein said enclosure member is of plexiglass.

10. The apparatus of claims 1 or 2 wherein said gas includes nitrogen.

11. The apparatus of claim 10 wherein said gas is selected from the group consisting of ionizeable gas, water vapor, mercury vapor, nitrogen, neon, xenon, argon and a plurality of electrons.

12. The apparatus of claims 1 or 2 wherein an electrical load is inserted in said external circuitry between said second and first electrodes.

13. The apparatus of claim 12 wherein said electrical load is a DC motor.

14. The apparatus of claims 1 or 2 wherein an aperture passes from said cavity through at least a member of said apparatus to the outside thereof.

15. The apparatus of claims 1 or 2 wherein said barrier layer is made of lime glass, or porcelain.

16. The apparatus of claims 1 or 2 wherein said first electrode is a wire grid mounted on said layer and extending outside of said enclosure member.

17. The apparatus of claims 1 or 2 wherein said heat means is a flame.

18. The apparatus of claims 1 or 2 wherein said barrier layer extends beyond the peripheries of said conductive surface and said second electrode.

19. The apparatus of claims 1 or 2 wherein a conductive layer is coated on said dielectric barrier layer.

20. The apparatus of claims 1 or 2 wherein said first electrode is a layer of conductive material coated on said dielectric barrier layer.

21. A method for converting heat to electricity comprising,
(a) positioning a non-porous dielectric barrier layer proximate a conducting member;
(b) positioning a first electrode proximate said barrier layer on the other side thereof;
(c) positioning a second electrode in spaced proximity with said barrier layer and said first electrode;
(d) electrically connecting said second electrode and said first electrode by external circuit means;
(e) admitting gas in the space between said second electrode and said barrier layer and maintaining said gas at a desired pressure;
(f) applying DC voltage across said electrodes and said conducting member to establish an electric field therebetween and
(g) applying heat to said conducting member to cause current to flow in said external circuit.

22. The method of claim 21 wherein porous dielectric material is placed in the space between said barrier layer and and said second electrode.

23. The method of claim 21 wherein said porous dielectric material is placed in the space between said first and second electrodes.

24. The method of claims 21 or 22 wherein said gas in said space between said second electrode and said layer is maintained at a pressure between 0.1 to $1 \times 10^{-5}$ torr.

25. The method of claim 24 wherein said gas is selected from the group consisting of water vapor, mercury vapor, nitrogen, neon, xenon and argon and a plurality of electrons.

26. The method of claims 21 or 22 wherein said conducting member is heated between 1° to 400° F. above said second electrode.

27. The method of claim 21 or 22 wherein the applied voltage is between 20,000 and 50,000 volts.

28. The method of claim 21 wherein said first electrode is a wire grid mounted close to said layer.

29. The method of claim 21 wherein an electric load is placed in said external circuit.

30. The method of claim 29 wherein said load is an electric motor.

31. The method of claim 21 wherein flame is applied directly to said conducting member on the reverse side thereof.

32. The method of claim 21 wherein solar heat is applied directly to said conducting member on the reverse side thereof.

33. The apparatus of claim 1 or 2 wherein said heat means is a lamp.

34. The apparatus of claim 1 or 2 wherein said heat means is eutectic salt.

35. The apparatus of claim 1 or 2 wherein said heat means is solar heat.

36. The apparatus of claims 1 or 2 wherein said barrier layer is made of plastic or acrylic.

* * * * *